United States Patent
Testin

(10) Patent No.: US 7,249,282 B2
(45) Date of Patent: Jul. 24, 2007

(54) EEPROM ENABLE

(75) Inventor: William John Testin, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 381 days.

(21) Appl. No.: 10/339,421

(22) Filed: Jan. 9, 2003

(65) Prior Publication Data
US 2003/0204776 A1    Oct. 30, 2003

Related U.S. Application Data

(60) Provisional application No. 60/376,443, filed on Apr. 29, 2002.

(51) Int. Cl.
*G06F 11/00* (2006.01)
(52) U.S. Cl. .......................................... 714/24; 714/15
(58) Field of Classification Search ................... 714/15, 714/24
See application file for complete search history.

(56) References Cited

U.S. PATENT DOCUMENTS

| | | | |
|---|---|---|---|
| 4,658,290 A | 4/1987 | McKenna et al. ............. 348/84 |
| 4,695,879 A | 9/1987 | Weinblatta | |
| 4,750,040 A * | 6/1988 | Hakamada ................... 348/725 |
| 5,519,663 A | 5/1996 | Harper, Jr. et al. | |
| 5,586,334 A | 12/1996 | Miyazaki et al. | |
| 5,710,930 A | 1/1998 | Lancy et al. ................. 395/750 |
| 5,790,878 A * | 8/1998 | Anderson et al. ........... 713/340 |
| 5,912,618 A | 6/1999 | Maugars ...................... 340/520 |
| 6,035,347 A * | 3/2000 | Beardsley et al. ............. 710/52 |
| 6,145,068 A * | 11/2000 | Lewis ......................... 711/170 |
| 6,151,541 A | 11/2000 | Iizuka | |
| 6,230,319 B1 | 5/2001 | Britt et al. ..................... 717/11 |
| 6,243,831 B1 | 6/2001 | Mustafa et al. ............... 714/24 |
| 6,304,981 B1 | 10/2001 | Spears et al. ................. 714/24 |
| 6,336,161 B1 | 1/2002 | Watts ........................... 711/103 |
| 6,694,453 B1 * | 2/2004 | Shukla et al. ................. 714/24 |
| 6,742,140 B2 * | 5/2004 | Caulkins ....................... 714/24 |

FOREIGN PATENT DOCUMENTS

EP    0518622    12/1992

OTHER PUBLICATIONS

Microsoft Computer Dictionary, Puchised by: Microsoft Press, Fourth Edition, Copyright 1999.*

* cited by examiner

*Primary Examiner*—Scott Baderman
*Assistant Examiner*—Brian Assessor
(74) *Attorney, Agent, or Firm*—Joseph J. Laks; Harvey D. Fried

(57) ABSTRACT

A system including a processor is energized from a source which is subject to power failure. To allow the state of the system to be restored after the power failure, at least portions of the volatile data of the processor are stored in non-volatile electrically erasable programmable read-only memory (Eeprom). In order to effectuate the data transfer, storage capacitors must provide power to the Eeprom and to the processor. In order to minimize the amount of storage capacitance, the processor power is maintained only until the data to be stored is transferred to the buffer of the Eeprom. Eeprom power is maintained until after a later time at which the buffer transfers the data to non-volatile storage of the Eeprom.

1 Claim, 4 Drawing Sheets

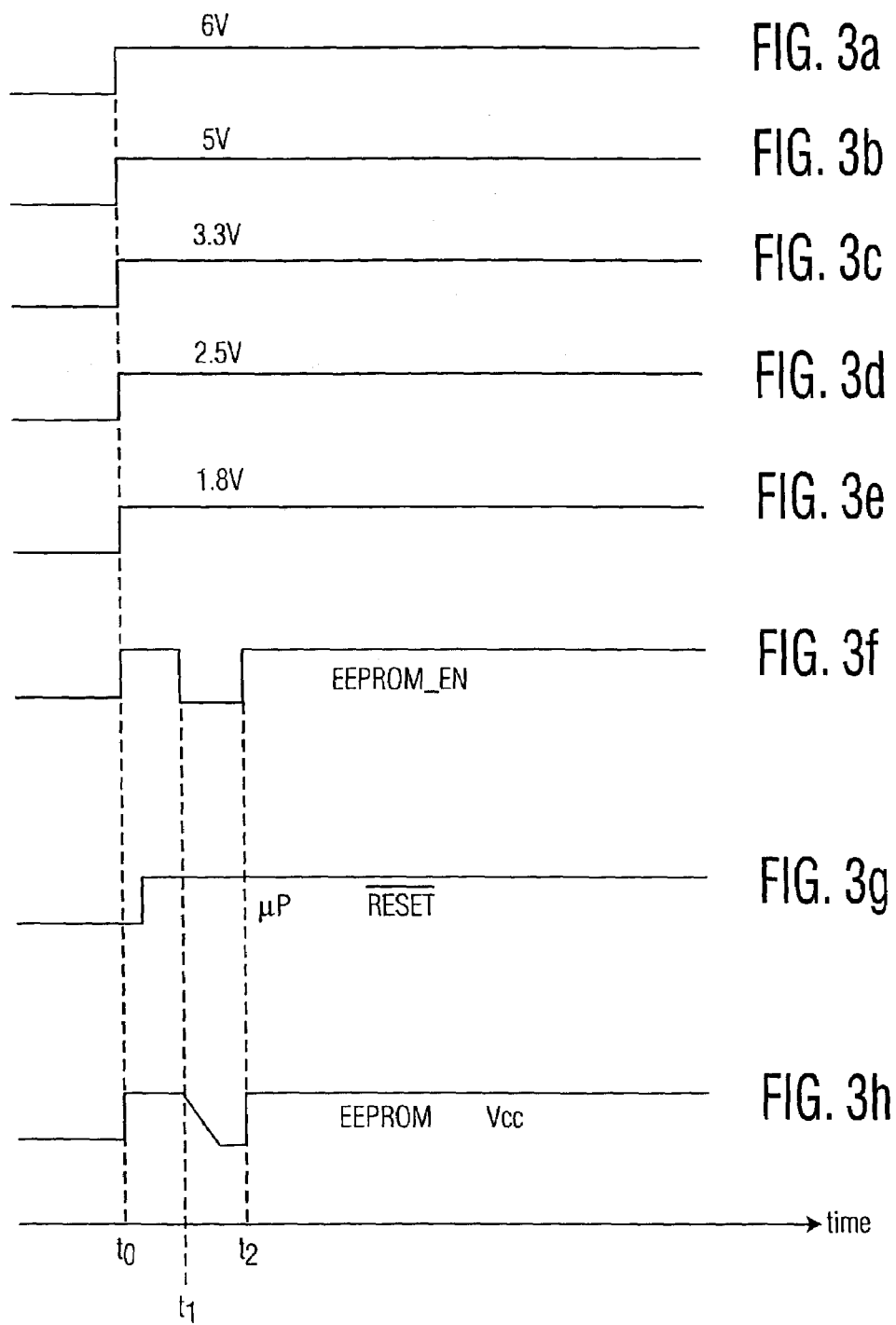

EEPROM ENABLE

This application claims the priority of Provisional application Ser. No. 60/376,443 filed Apr. 29, 2002 in the name of William John Testin.

FIELD OF THE INVENTION

This invention relates to storage of data in electronic systems, and more particularly to storage of data in systems subject to power outages.

BACKGROUND OF THE INVENTION

Televisions do not typically remember the last operating state of the set in the event of a power failure. Thus, the occurrence of a power failure may necessitate reprogramming of the set to restore it to the same state it had at the time of the power outage. One piece of data which may not be stored is the time of day, which is typically counted by a clock. In order to save money, the clock does not have its own power source, and so the clock loses the current time upon power failure. There are other pieces of data which might be useful in restoring the state of a television receiver after a power failure, such as the ON or OFF state of the set, the audio volume level and the channel.

In one prior-art scheme, an Eeprom was used to store data from a microprocessor of the receiver during a power failure. The video processor and Eeprom were powered until the transfer of the data to non-volatile storage occurred. As the processing power of the video processors increases for providing high definition television, so does the cost of powering the various elements required to transfer data to non-volatile storage.

Improved data storage arrangements are desired.

An Electrically Erasable Programmable Read-Only-Memory (Eeprom) may include a volatile input data buffer and a non-volatile data storage region. The time required for transfer of data into non-volatile portions of the Eeprom includes the sum of the time required to store the data in the buffer, plus the time required to transfer the data from the buffer to the non-volatile storage region. According to an aspect of the invention, power is applied to the processor of the system upon the occurrence of a power failure for only so long as is required in order to sense the power failure and to transfer the data to be stored from the processor to the buffer of the Eeprom. Power is provided to the relatively high-power processor for only the minimum time required for the data transfer, and the relatively low-power Eeprom can be maintained operative for an additional length of time to allow it to complete the transfer of data from the buffer to the non-volatile storage portion of the Eeprom.

SUMMARY OF THE INVENTION

A data storage arrangement of a video display according to an aspect of the invention) comprises a volatile memory containing data used for controlling an operational parameter of the video display, during normal operation. A buffer memory has an input coupled to an output of the volatile memory. A non-volatile memory has an input coupled to an output of the buffer memory. A detector detects a loss of power and initiates a first data transfer from the volatile memory to the buffer memory, when the loss of power is detected, and initiates a second data transfer from the buffer memory to the non-volatile memory, such that at least a portion of the second data transfer occurs after the first data transfer has been completed. A first power supply energizes the volatile memory, during the first data transfer, such that, during the second data transfer portion, the volatile memory is in a de-energized state. A second power supply energizes the non-volatile memory, during at least the second data transfer portion, such that, after the second data transfer has been completed, the non-volatile memory is in a de-energized state. In a preferred embodiment according to an aspect of the invention, the non-volatile memory comprises an electrically erasable programmable read-only memory. According to another aspect of the invention, the second power supply also energizes the buffer memory, during said second data transfer portion, such that, after the second data transfer has been completed, the buffer memory is in a de-energized state.

BRIEF DESCRIPTION OF THE DRAWING

FIG. 1b is a simplified block diagram of a non-volatile storage element of FIG. 1a;

FIG. 2 is a simplified diagram in schematic form illustrating details of a switch element of FIG. 1a;

FIGS. 3 and 4 are simplified timing diagrams illustrating the temporal relationships of the various steps, waveforms, and voltages according to aspects of the invention.

DESCRIPTION OF THE INVENTION

Figure 1A:
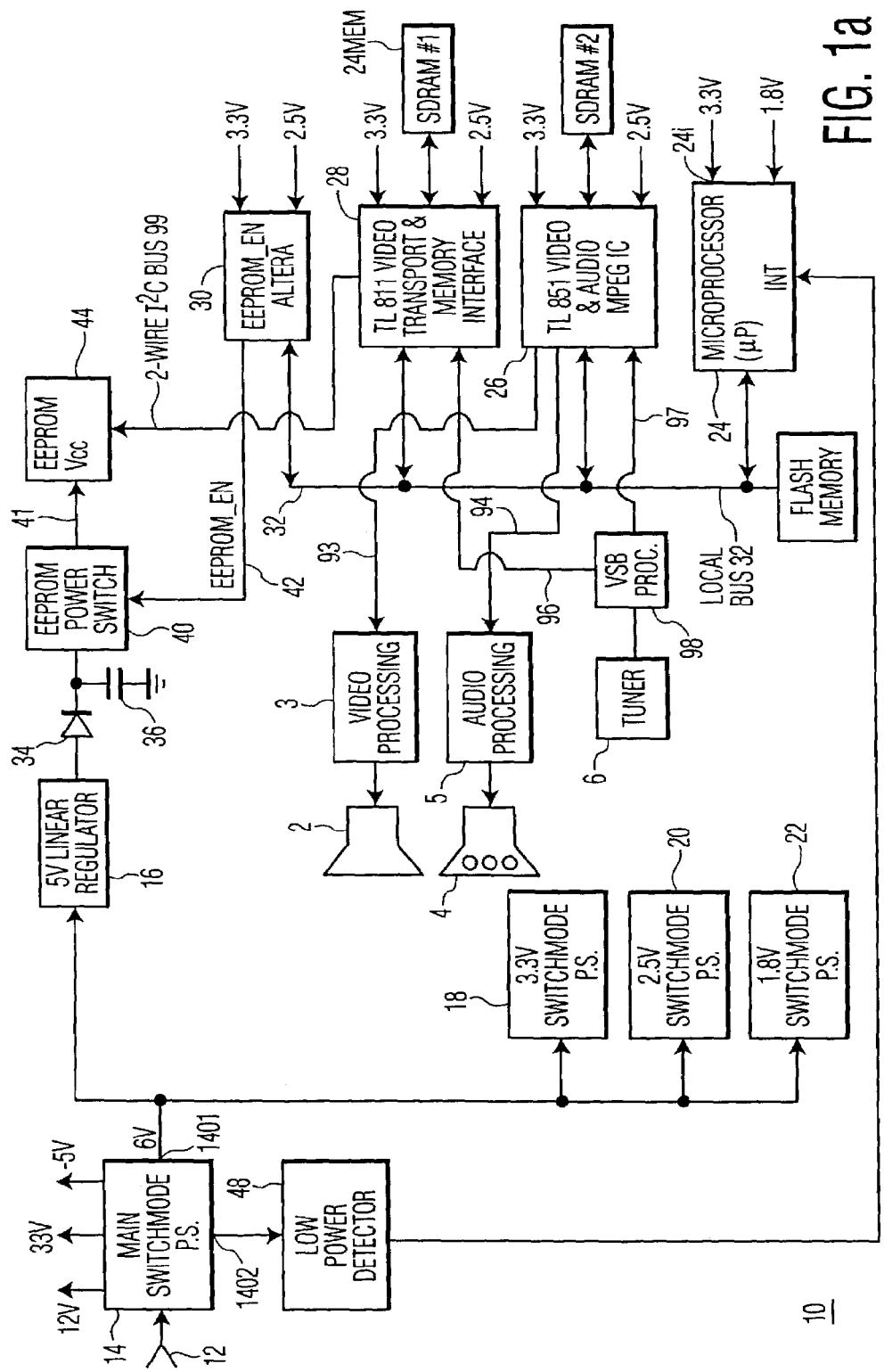
FIG. 1a is a simplified block diagram of a video or television apparatus according to an aspect of the invention.

FIG. 1a is a simplified block diagram of a portion 10 of a video or television device according to an aspect of the invention, in which a picture tube 2 receives and displays signals from analog video processing illustrated as a block 3, and a speaker 4 produces sound from analog signals produced by an audio processor 5. A tuner 6 receives the channel to be viewed. Also in FIG. 1a, power is applied by way of a port 12 to a block 14, which represents a main switch-mode power supply. Supply 14 produces various direct output voltages, including −5 volts, 12 volts, and 33 volts, for powering various portions of the device. Supply 14 also produces a 6-volt output at a port 14o1 and a sense voltage at a port 14o2. The 6-volt output of the main switchmode power supply 14 is applied from port 14o1 to a 5-volt linear regulator 16, and to a 3.3-volt switch mode power supply 18, a 2.5-volt switch mode power supply 20, and a 1.8-volt switch mode power supply 22, for producing energizing voltages for portions of the device.

Also in FIG. 1a, a processor illustrated as 24 and using an instruction set receives 1.8 and 3.3 volt energization from switch mode power supplies 18 and 22, respectively, and, with the aid of an associated volatile random-access SDRAM memory (RAM) 24Mem, accessible by way of a local bus 32 and through a video transport and memory interface integrated circuit 28, performs the main control processing for the digital television device. Memory block 24Mem may be considered to be the output buffer of the microprocessor 24 onto the local data bus 32. The microprocessor 24 commands tuner 6 to receive a particular channel as determined by a user. The received signals on the selected channel are applied to a Vestigial Side Band (VSB) block 98, which couples high-definition Advanced Television System Committee (ATSC) or 2H signals by way of path 96 to integrated circuit 28, and digitizes standard-definition (NTSC) signals for application by way of a path 97 directly to an integrated circuit 26. Integrated circuit 28 receives the processed information from VSB block 98.

Integrated circuit 26 processes the digitized 1H standard-definition signals to produce audio, 2H video, and control parameters. Also, integrated circuit (IC) 26 coacts with integrated circuit 28 to process Moving Pictures [Image Coding] Experts Group (MPEG) signals to produce audio, 2H video, and control parameters. From whichever source, the audio signals are applied from MPEG IC 26 to audio processor block 5 by way of a path 94, and the video signals are applied to video processor block 3 by way of a path 93. The audio control parameters, such as audio volume, channel separation, and the like, are coupled to audio processor 5. Integrated circuit 26 receives 3.3 volts and 2.5 volts from switch mode power supplies 18 and 20, respectively. Integrated circuit 28 receives 3.3 volts and 2.5 volts from switch mode power supplies 18 and 20, respectively, and performs the video processing for the device. An ALTERA Field Programmable Gate Array (FPGA) is illustrated as a block 30. This ALTERA FPGA has part number EPIK30WC208-3, but other types or brands of FPGA may be used. FPGA 30 receives energization at 3.3 volts and 2.5 volts from switch mode power supplies 18 and 20, respectively. FPGA 30 contains "glue" logic elements in the form of gates for interconnecting the remainder of the logic by way of signal paths which are not illustrated. Blocks 24, 26, 28, and 30 are connected to a local data bus designated 32.

The 5-volt energization produced by linear regulator 16 of FIG. 1a is applied by way of a rectifier or diode illustrated as 34 to a storage capacitor 36. An Eeprom power control switch illustrated as a block 40 is energized with the voltage appearing across capacitor 36, which under ordinary circumstances is maintained by the 5 volt energization produced by linear regulator 16. Eeprom power control switch 40 is controlled by the state of an Eeprom_EN signal applied from FPGA 30 by way of a path 42, and provides power by way of a path 41 to enable an Eeprom 44. Eeprom 44 is coupled to bus 32 by way of I$^2$C bus 99 and integrated circuit 28, and so is effectively coupled to the volatile memory 24Mem associated with microprocessor 24. Consequently, Eeprom 44 is able to receive the data to be stored in the event of a power loss.

Figure 1B:
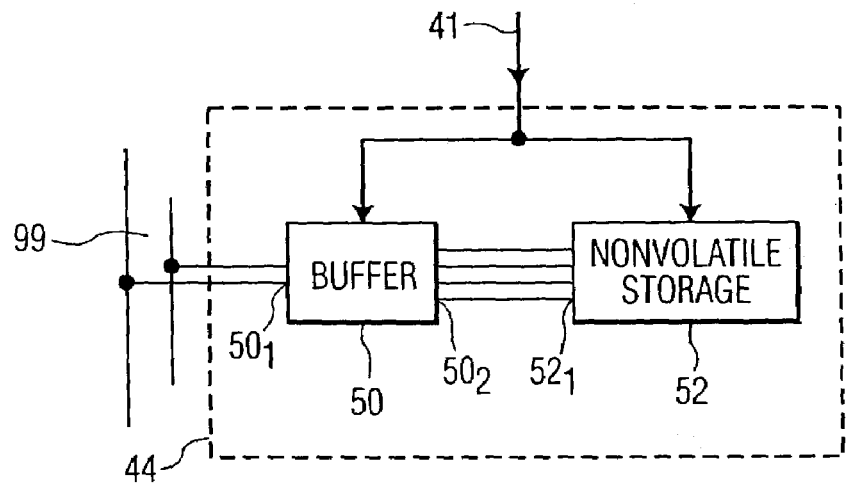

The Eeprom 44 in one embodiment of the invention is a type M24C64-WMN6T fabricated by ST, but other types may be used. FIG. 1b illustrates some details of Eeprom 44 of FIG. 1a. In FIG. 1b, Eeprom 44 receives energizing power or potential from path 41, and applies the energizing power in common to a buffer 50 and non-volatile storage 52. Buffer 50 has a port $50_1$ connected to two-wire I$^2$C bus 99 for receiving data therefrom when commanded by processor 24 of FIG. 1a, and for transferring the data from a second port $50_2$ to a port $52_1$ of non-volatile memory or storage 52. As mentioned, there is a time lag between the time at which buffer 50 accepts or receives the data to be stored and the later time at which the data stored in buffer 50 is fully transferred to non-volatile storage 52.

A power outage sensing arrangement illustrated as a block 48 in FIG. 1a is connected to port 14o2 of main switch mode power supply 14, for producing a signal which anticipates a total power outage. The voltage at output port 14o2 is taken to be 6 volts, as an example, under normal conditions. So long as the voltage of the 6-volt supply at port 14o2 of switch mode power supply 14 exceeds a given value, taken for example as being 5.5 volts, the power is deemed to be ON, and power outage sensing arrangement 48 produces a first state of a control signal. However, when the voltage goes below the given value, detector 34 produces a signal, which is sent to an interrupt (INT) terminal of microprocessor 24, to begin the storage of data to be saved, preparatory for the complete loss of power.

Figure 2:
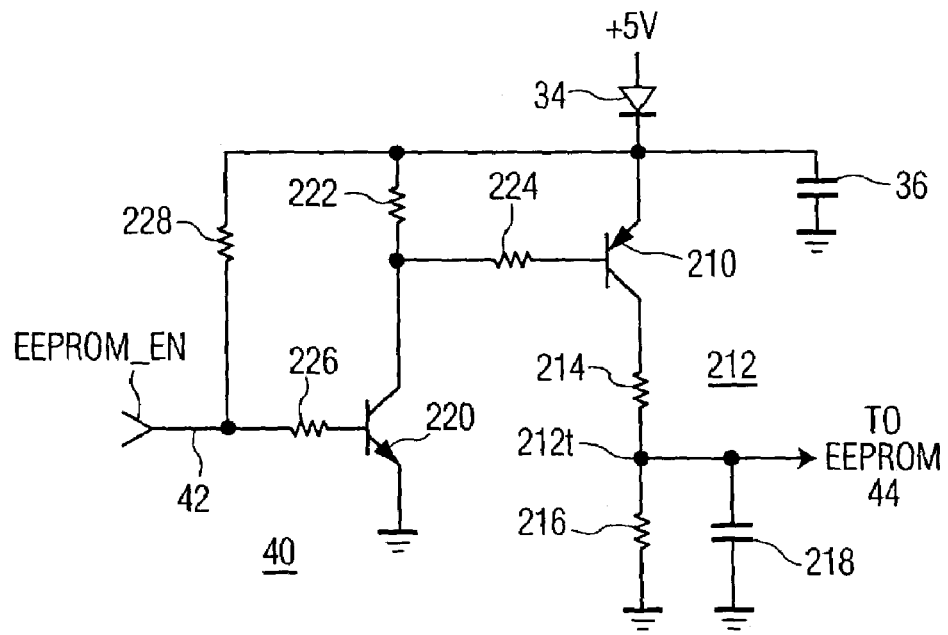

FIG. 2 is a simplified schematic diagram of Eeprom power switch 40 of FIG. 1a. In FIG. 2, the emitter of a PNP transistor 210 is connected to the cathode of diode or rectifier 34 and to the hot terminal of storage capacitor 36. When transistor 210 is conductive, a voltage near the capacitor voltage is applied across a voltage divider designated generally as 212, which includes the serial combination of resistors 214 and 216, and a tap 212t. The voltage at tap 212t is filtered by a capacitor 218. The value of resistor 214 is selected to limit the inrush current of capacitor 218. The voltage across capacitor 218 is applied to the Vcc input port of Eeprom 44 (FIG. 1a) for energization thereof. In the arrangement of FIG. 2, transistor 210 is enabled only when an NPN transistor 220 is conductive. Transistor 220 has its emitter grounded and its collector connected to capacitor 36 by way of a resistor 222. The voltage at the collector of transistor 220 is communicated to the base of transistor 210 by a resistor 224. The Eeprom_EN signal from FPGA 30 of FIG. 1a is applied by way of path 42 of FIG. 2 and a resistor 226 to the base of transistor 220. A pull-up resistor 228 pulls the base of transistor 220 positive during those intervals when a high or "tristate" impedance is applied to path 42. The tristate condition occurs when the power source to FPGA 30 drops below a given value, such as one volt. Thus, transistor 220, and consequently transistor 210, is rendered conductive when a positive voltage (a logic "1" or logic "high") is applied over path 42, or when path 42 is tristate. Transistor 220, and consequently transistor 210, is nonconductive when a logic "0" or logic "low" is applied by way of path 42 from FPGA 30 of FIG. 1a.

When switch 40 of FIG. 2 is open, which is when a logic low level is applied to path 42, energizing voltage to Eeprom 44 is cut off, and Eeprom 44 is cleared. During those intervals in which Eeprom power switch 40 is conductive, power flows from capacitor 36 and/or linear regulator 16 of FIG. 1a, and the Eeprom is energized for accepting commands and for storing data.

"FIG. 3" is a term applied to FIGS. 3a, 3b, 3c, 3d, 3e, 3f, 3g, and 3h, taken as a whole. The waveforms of FIG. 3 are those occurring at initial turn-on or boot-up of the device. In FIG. 3, t0 represents the turn-on time. At turn-on time t0, the 6-volt supply voltage rises to 6 volts as indicated by FIG. 3a, the 5-volt linear regulator output rises to 5 volts as indicated by FIG. 3b, and the 3.3, 2.5, and 1.8-volt supply voltages rise, as indicated by FIGS. 3c, 3d, and 3e, respectively. In FIG. 3, times t1 and t2 represent the times between which FPGA 30 of FIG. 1a produce a logic low level on signal path 42, as suggested by FIG. 3f, to turn OFF transistors 210 and 220, to thereby disable the 5-volt supply to Eeprom 44, which allows resistor 216 to discharge capacitor 218 to thereby remove energization voltage from Eeprom 44, to thereby clear its input register or buffer The energization Vcc of the Eeprom 44 is illustrated in FIG. 3h, and can be seen to drop to zero in the time just before time t2. In effect, the logic low level initiated at time t1 disables Eeprom enable switch 40 of FIG. 1a, and as a result the voltage at the power input pin of the Eeprom 44 ramps toward zero voltage, as illustrated between times t1 and t2 in FIG. 3h. The processor comes out of the reset (inoperative) state shortly after the initial turn-on of the device at time t0, as suggested by FIG. 3g. The reset of the microprocessor is performed in order to set all the logic gates to known conditions, and to allow any internal clock time in which to stabilize. The reset state is the logic low or logic 0 level of FIG. 3g, and the logic high or logic 1 state is designated by reset bar represents the operational state of the microprocessor. After time t2 of FIG. 3, the device is in its normal operating state, and the various voltages and signals remain in the states illustrated to the right of time t2 until a power loss is detected.

Figure 4A:
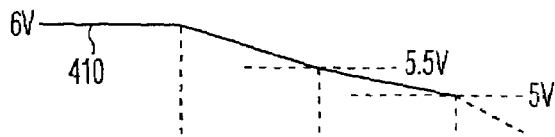
Figure 4B:
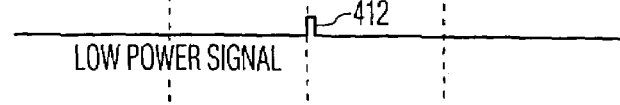
Figure 4C:
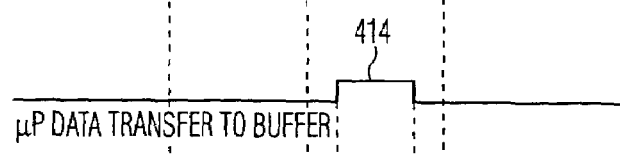

The term "FIG. 4" is used to refer jointly to FIGS. 4a, 4b, 4c, 4d, 4e, 4f, 4g, 4h, and 4i. The waveforms, states and voltages of FIG. 4 are those which are relevant in the context of a power failure beginning at a time designated as t6. Plot 410 of FIG. 4a represents the voltage produced at the 6 volt output 14o1 of main switch mode power supply 14 of FIG. 1a. As illustrated by plot 410 of FIG. 4a, the 6-volt supply begins to drop at time t6, representing the time at which a power failure occurs. The 5-volt supply 16 of FIG. 1a has a one-volt inherent offset between its 6-volt input and its 5-volt output. At a time illustrated as t8 in FIG. 4, the 5-volt supply voltage represented by plot 418 of FIG. 4e begins to decrease in magnitude or "drop", because the 5-volt supply 16 of FIG. 1a is fed from the 6-volt source, which began dropping at time t6. After time t8, the 5-volt supply decreases in correspondence with the 6-volt supply. Shortly thereafter, at a time illustrated as t10 in FIG. 4, the Eeprom supply voltage, which is represented by plot 422 of FIG. 4g, begins to drop, because its 5-volt source is decreasing in magnitude. Thus, the Eeprom 44 of FIG. 1a is powered by the 5-volt supply 16 until time t10, and is thereafter powered by the voltage remaining on capacitors 36 and 218. The source of power to the Eeprom is illustrated by the state diagram 426 of FIG. 4i, which shows a low level, representing powering by the 5-volt supply, until time t10, and thereafter shows powering from C36/218 until a time t26. The decreasing voltage of the six-volt supply 14 of FIG. 1a crosses the 5.5-volt trigger level of low power detector 48 of FIG. 1a at a time illustrated in FIG. 4 as t12. Beginning at time t12 of FIG. 4, low power detector 48 of FIG. 1a produces an interrupt command, illustrated as 412 of FIG. 4b, which is applied to processor 24 of FIG. 1a to initiate data transfer to non-volatile storage. Beginning at time t14 of FIG. 4, processor 24 of FIG. 1a responds to the interrupt command by transmitting over bus 32, integrated circuit 28, and path 99 to Eeprom 44 of FIG. 1b both storage commands and data to be stored, as suggested by the microprocessor (:P) data transfer state 414 of FIG. 4c in the interval t14–t16. The data transferred during the time interval illustrated as 414 of FIG. 4c puts data into the buffer 50 of Eeprom 44 of FIG. 1b. The data transfer to buffer is completed at a time illustrated as t16 in FIG. 4. At some slightly later time illustrated as time t18 in FIG. 4, Eeprom 44 of FIG. 1b internally initiates the transfer of data from the buffer to nonvolatile memory upon reception of the standard "stop bit" of the I²C bus 99 (not illustrated). The internal data transfer interval from buffer 50 to nonvolatile storage 52 in the Eeprom 44 of FIG. 1b is suggested by the time period designated as 424 of FIG. 4h, which extends from time t18 to time t20.

Figure 4D:
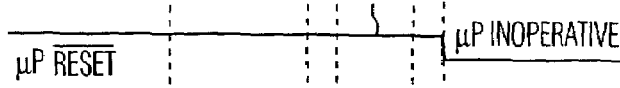
Figure 4E:
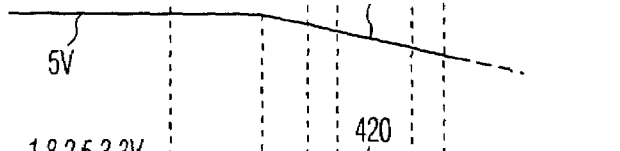
Figure 4F:
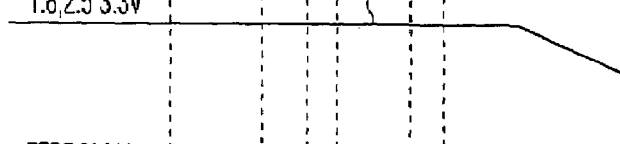
Figure 4G:
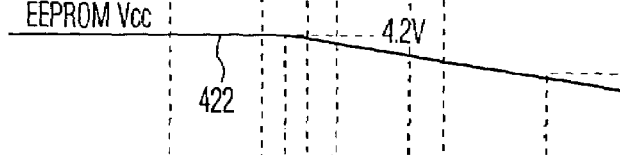
Figure 4H:
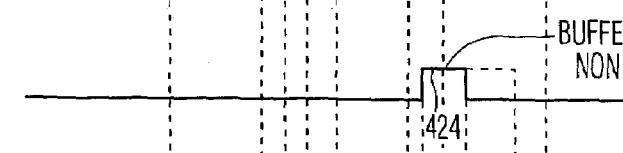
Figure 4I:
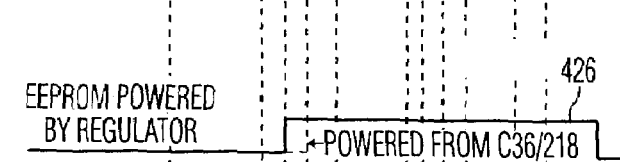

At a time illustrated as time t19 in FIG. 4, the voltage of the 6-volt supply drops to a level, illustrated as around 5 volts in FIG. 4a, such that :P 24 is reset, as suggested by state 416 of FIG. 4d, and :P 24 becomes inoperative. The switching regulators 18, 20, and 22 of FIG. 1a also derive their power from the six-volt supply, so their voltage also begins to drop after the six-volt supply begins its drop, as suggested by waveform 420 of FIG. 4f; this time is not critical to the invention and is not designated.

Power for the Eeprom 44 of FIG. 1a is derived from the 5-volt supply 16 prior to time t10 of FIG. 4. Since there is a diode 34 of FIG. 1a in series with supply 16, the 5 volts available to Eeprom 44 during this time is reduced by the forward offset voltage of the diode to around 4.2 volts, as indicated by plot 422 of FIG. 4g. After time t10 of FIG. 4, the 5-volt supply voltage represented by 418 of FIG. 4e has dropped low enough so that the Vcc energizing voltage available to Eeprom 44 of FIG. 2 is provided by capacitors C36 and C218. The voltage available to Eeprom 44 of FIG. 1 from capacitors C36 and C218 of FIG. 2 continues, albeit at decreasing voltage, from time t10 until a later time t26, as suggested by voltage plot 422 of FIG. 4g. The Eeprom 44 of FIG. 1a is rated to operate at some minimum supply voltage, illustrated as being 2.8 volts in FIG. 4g. Thus, Eeprom 44 of FIG. 1a is enabled or energized by capacitors C36/218 of FIG. 1b and FIG. 2 for the interval t10 through t24 of FIG. 4, and can therefore perform all of its functions, including transfer of data from the buffer 50 of FIG. 1b to non-volatile storage 52, even after :P 24 of FIG. 1a has ceased to function at time t19. The period during which the Eeprom buffer 50 of FIG. 1b writes to non-volatile storage 52 is illustrated as extending from time t18 to a time which may be selected within the range of ranging from t20 to t22, as suggested by 424 in FIG. 4h. As may be deduced, there is a guard time between the latest time for transfer of data from buffer to nonvolatile storage, which is time t22, and the time at which the buffer supply voltage decreases below its rated operating value, which is illustrated as t24 in FIG. 4. In addition to this guard time, there may be in most manufactured units an additional guard time, attributable to the potential for operating at least some of the buffers at values of energizing voltage lower than their minimum rated values. The time allowable for transfer of data from buffer 50 of FIG. 1b to non-volatile store 52 is decided during the design of the device 10. The nominal capacitance of capacitor 36 in relation to the current drain of the worst (highest current drain) Eeprom (as well as other parameters) is selected so that the lowest-capacitance capacitor will maintain the Eeprom energized until after the time at which data transfer from buffer to non-volatile storage is accomplished. Since the distribution of component variation and tolerance will in the average apparatus be much greater than the minimum allowable value, there will ordinarily be some time after transfer of data from buffer to non-volatile memory is completed during which the Eeprom continues to be energized sufficiently to operate. Thus, the continued energization time during which Eeprom 44 of FIG. 1 continues to be energized after the 5-volt regulator 16 fails to produce useful output lies between times t8 and a time later than time t24 of FIG. 4, as suggested by the energization state 426 of FIG. 4i.

In one embodiment of the invention, the interval t10–t24 is a minimum of 10 milliseconds (msec). Between the time t19 at which the processor resets and a time later than time t22, Eeprom 44 can perform transfers of data stored in buffer to non-volatile memory.

Thus, the relatively high-power processor 24 need not be powered for any longer a time than is required to transfer the data to be stored to an input buffer associated with the Eeprom 44, and the processor 24 can be allowed to become de-energized at a time before the Eeprom 44 has completed transfer of the data from volatile buffer to non-volatile storage. This advantageously reduces the cost of energy storage which would be required if the processor 24 were kept in operation until the Eeprom 44 was finished with its operation. Only the relatively low-power Eeprom 44 is powered until the time at which the data is stored in non-volatile memory. Thus, the data is available from the non-volatile memory of Eeprom 44 at the next power-up following the power failure. The initial clearing of the buffer by Eeprom_En at power-up does not affect the non-volatile portions of the Eeprom, which remain available.

What is claimed is:

1. A data storage device comprising:
a volatile memory storing data for a video display;
a buffer memory coupled to an output of said volatile memory;
a non volatile memory coupled to an output of said buffer memory;
a first power supply coupled to said volatile memory;
a second power supply coupled to said non volatile memory;
a power sensing device coupled to said first power supply;
a controller coupled to said power sensing device, said volatile memory, said buffer memory, said non volatile memory, and said first and second power supplies;
said controller configured to first transfer said data from said volatile memory to said buffer memory when said power sensing devices senses a low power condition and subsequently to transfer data from said buffer memory to said non volatile memory;
said first power supply energizing said volatile memory during said first data transfer and at least a portion of said subsequent data transfer;
said first power supply de-energizing said volatile memory before said subsequent data transfer is competed.

* * * * *